United States Patent [19]
Arnold

[11] 3,906,586
[45] Sept. 23, 1975

[54] PROTECTOR DEVICE

[75] Inventor: William O. Arnold, Parkersburg, W. Va.

[73] Assignee: Union Insulating Company, Parkersburg, W. Va.

[22] Filed: Dec. 10, 1974

[21] Appl. No.: 531,379

[52] U.S. Cl. .................... 16/2; 174/153 G; 248/56
[51] Int. Cl.² ................ B65D 7/48; B65D 11/26; B65D 55/00; F16L 5/00
[58] Field of Search .... 16/2, 108; 174/65 G, 152 G, 174/153 G; 248/56

[56] References Cited
UNITED STATES PATENTS

| | | | |
|---|---|---|---|
| 2,744,776 | 5/1956 | Brown | 248/56 X |
| 3,092,360 | 6/1963 | Cook et al. | 248/56 |
| 3,229,026 | 1/1966 | Sulzer | 16/2 X |
| 3,634,608 | 1/1972 | Buhl et al. | 16/2 X |

OTHER PUBLICATIONS
Union Insulating Company, Catalog C-1, Subsidiary of GTE Sylvania, Inc., 100 First Ave., Waltham, Mass., 02154, Catalog p. 23, cited, Article No. NAED-EDP-80090, Article No. NAED-EDP-80100, Publication Date, Jan. 25, 1974.

Primary Examiner—Werner H. Schroeder
Assistant Examiner—Wayne L. Shedd
Attorney, Agent, or Firm—Peter Xiarhos; Elmer J. Nealon; Norman J. O'Malley

[57] ABSTRACT

A cable protector for providing 360° protection for a cable arranged to pass through an opening in a construction member such as a thin-gauge metal stud. The cable protector includes a three-sided basically V-shaped member and various members integral therewith for fitting the cable protector securely within an opening in a construction member. The cable protector further includes a pair of horizontal arm members integral with the V-shaped member for closing off, or bridging, the open side of the V-shaped member thereby to surround or encircle a cable arranged to pass through the cable protector and the associated opening in the construction member.

9 Claims, 13 Drawing Figures

PROTECTOR DEVICE

BACKGROUND OF THE INVENTION

The present invention relates to a cable protector and, more particularly, to a cable protector for providing 360° protection for a cable arranged to pass through an opening in a construction member.

In various kinds of building constructions, there is often the need for cable protectors for protecting electrical cables or conductors against the possible cutting effects of the material of edge surfaces at the periphery of openings formed in construction members (e.g., thin-gauge metal studs) through which the cables or conductors are arranged to pass. One well-known cable protector used for the above purpose, typically made of plastic, includes a three-sided, basically V-shaped member having a flat base portion and a pair of flat side portions extending upwardly from opposite ends of the flat base portion, each of the flat side portions forming an obtuse angle (e.g., approximately 120°) with respect to the flat base portion. The flat base portion further has one or two pairs of spaced gripping elements extending normally from a bottom surface thereof for use in attaching the cable protector to one or more portions of a construction member (e.g., a metal stud) adjacent to an opening in the construction member, and each of the flat side portions has a pair of spaced confinement elements extending normally from an outer surface thereof for contacting other portions of the construction member adjacent to the opening to further fit and retain the cable protector in the opening in the construction member. When a cable protector of the above type is arranged in an opening as described, a cable may be made to pass through the cable protector and the associated opening to any desired external location. To insure that the cable protector may be used in an opening of any one of several possible configurations (e.g., round, oval, square, T-shaped, etc.), the flat side portions of the cable protector are made to be flexible so that they may be flexed toward each other to adjust to and accommodate the particular configuration of the opening. When the cable protector is positioned in an opening, the flat side portions are biased outwardly to provide an especially tight fit within the opening. A suitable material from which the above-described cable protector may be fabricated is a fire-retardant grade of acrylonitrile butadiene styrene (ABS), a well-known thermoplastic material having desirable insulating properties.

While cable protectors of the above type have been used successfully in the building construction industry, they do not provide complete 360° protection for cables. It is possible, therefore, for a cable arranged to pass through a cable protector of the above type to be disturbed from its resting position, for example, during the stringing of the cable from one construction member to another, and to make physical contact with the material of an exposed edge surface of the construction member at the periphery of the opening adjacent to the open side of the V-shaped member of the cable protector. If the exposed edge surface of the construction member is sharp and the contact therewith by the cable is repeated, there is the possibility of the cable being undesirably penetrated.

BRIEF SUMMARY OF THE INVENTION

In accordance with the present invention, a protector device is provided by which an elongated member (e.g., a cable) may be protected through a complete range of 360°. The elongated member is arranged to pass through the protector device and through an opening in a construction member (e.g., a thin-gauge metal stud) in which the protector device is adapted to be inserted.

The protector device of the invention includes a main body member. This main body member includes a base portion having first and second end regions, and first and second flexible side portions. The first and second flexible side portions extend upwardly from, and form angles with, the first and second end regions, respectively, of the base portion. The protector device further includes gripping means associated with the base portion of the main body member and confinement means associated with the first and second side portions of the main body member. The gripping means is used for gripping at least one portion of a construction member at the periphery of an opening in the construction member and the confinement means is used for engaging other portions of the construction member at the periphery of the opening in the construction member.

The protector device of the invention further includes first and second arm members. The first arm member extends from the first side portion of the main body member in a direction toward the second side portion of the main body member, and the second arm member extends from the second side portion of the main body member in a direction toward the first side portion of the main body member. The first and second arm members are in respective first and second planes with the second plane of the second arm member being offset with respect to the first plane of the first arm member. As a result, an open space is established between the first and second arm members. In accordance with the invention, each of the first and second arm members further has a length whereby when the first and second flexible side portions of the main body member are flexed toward each other the first and second arm members move past each other in opposite directions.

BRIEF DESCRIPTION OF THE DRAWINGS

Various objects, features and advantages of a cable protector in accordance with the present invention will be apparent from the following detailed discussion taken in conjunction with the accompanying drawings in which.

DETAILED DESCRIPTION OF THE INVENTION

Figure 1:
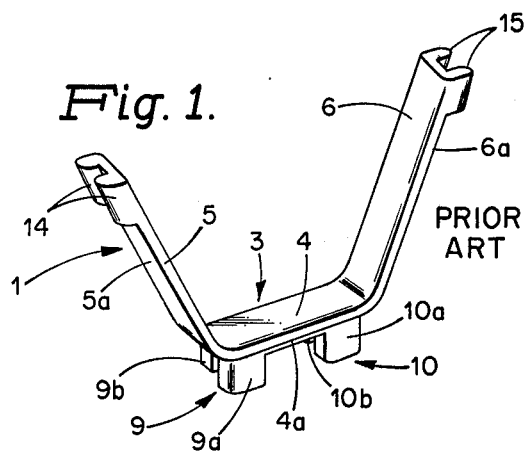
FIGS. 1, 2, 3 and 4 are perspective, front, top and side views, respectively, of a cable protector in accordance with the prior art.
Figure 2:
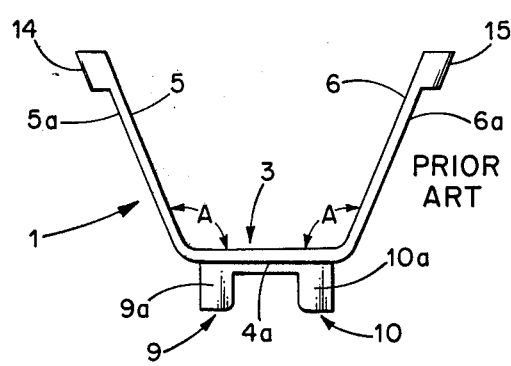
Figure 3:
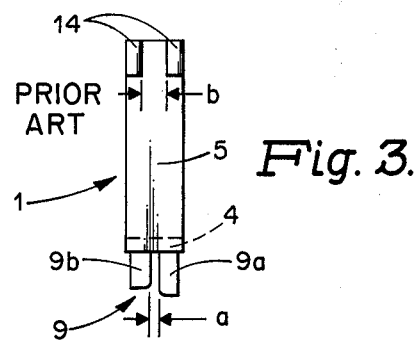

Referring now to FIGS. 1–4, there are shown in perspective, front, side and top views, respectively, a cable protector 1 in accordance with the prior art. As shown in FIGS. 1–4, the cable protector 1 includes a three-sided basically V-shaped main body member 3 having a flat base portion 4 and a pair of flat side portions 5 and 6, both of which are flexible, extending from opposite end-regions of the flat base portion 4. As indicated in FIG. 2, each of the side portions 5 and 6 forms an obtuse angle A with the base portion 4, a typical value for the angle A being 120°. The cable protector 1 further includes two pairs of gripping members 9 and 10, which, as will be described in detail hereinafter, are used in attaching the cable protector 1 to a construction member from within an opening provided in the construction member. As shown in FIGS. 1–4, the pairs of gripping members 9 and 10 are integral with and extend normally from a bottom surface 4a of the base portion 4. The pair of gripping members 9 includes a front member 9a and a shorter rear member 9b parallel to and spaced from the front member 9a. Similarly, the pair of gripping members 10 includes a front member 10a in line with the front member 9a and a shorter rear member 10b in line with the rear member 10a. The front members 9a and 10a are spaced from the rear members 9b and 10b by a distance a, as shown in FIG. 3, which is generally made at least equal to the thickness of the material of the construction member at the periphery of the opening in which the cable protector 1 is to be inserted. The rear members 9b and 10b of the pairs of gripping members 9 and 10 are made to be shorter than the associated front members 9a and 10a, respectively, to facilitate the insertion of the cable protector 1 in the opening in the construction member, as will also be described in detail hereinafter.

Figure 4:
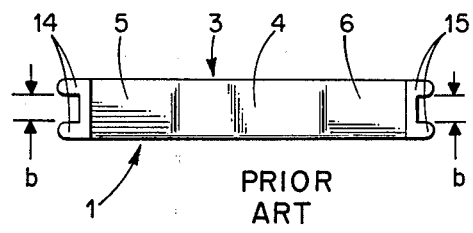
Figure 6:
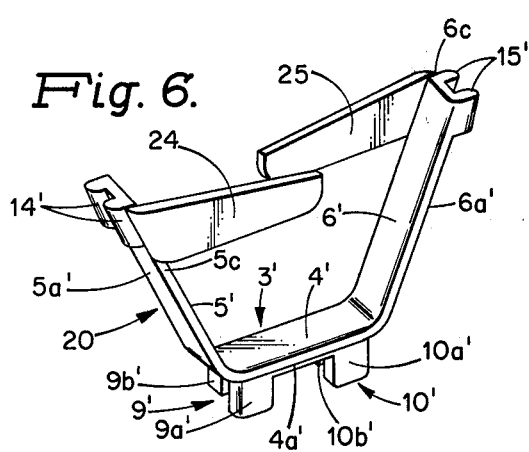
FIGS. 6, 7, 8 and 9 are perspective, front, top and side views, respectively, of an improved cable protector in accordance with the present invention.
Figure 7:
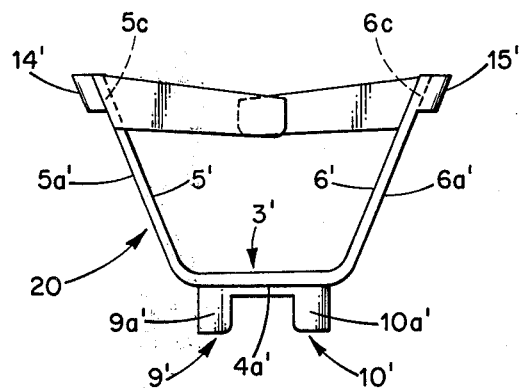
Figure 8:
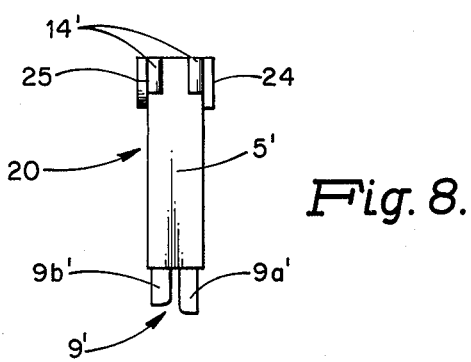

The prior art cable protector 1 of FIGS. 1–4 further includes two pairs of confinement members, or protrusions, 14 and 15 at the free ends of the side portions 5 and 6, respectively, of the V-shaped member 3 and extending normally from outer surfaces 5a and 6a of the side portions 5 and 6. The confinement members of each of the pairs of confinement members 14 and 15 are spaced from each other by a distance b, as shown in FIGS. 3 and 4, which is generally made to be greater than the thickness of the material of the construction member at the periphery of the opening in the construction member in which the cable protector 1 is to be inserted. As will be apparent hereinafter, the confinement members 14 and 15 are employed to physically contact certain portions of the construction member at the periphery of the opening therein, after the pairs of gripping members 9 and 10 have been secured within the opening in the construction member, to insure that the cable protector 1 will not become dislodged from its desired position of the opening. A suitable material for the cable protector 1 is a fire-retardant grade of acrylonitrile butadiene styrene (ABS).

Figure 5:
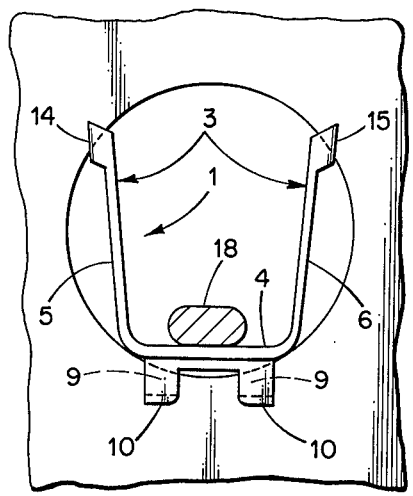
FIG. 5 is a front view illustrating the manner in which the cable protector of FIGS. 1–4 may be fit within an opening provided in a construction member such as a thin-gauge metal stud.
Figure 10:
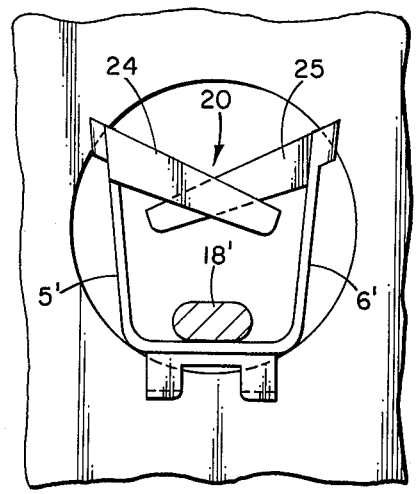
FIGS. 10–13 are front views illustrating the manner in which the improved cable protector of the invention may be fit within openings of different physical configurations in construction members.
Figure 11:
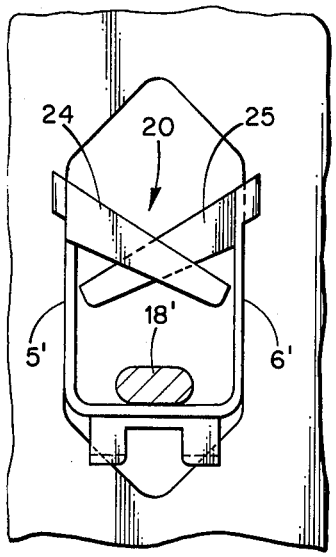
Figure 12:
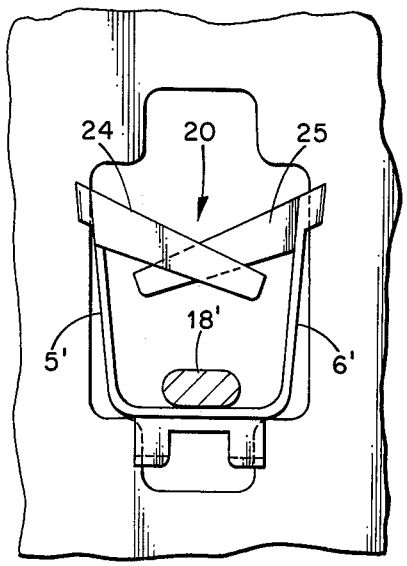
Figure 13:
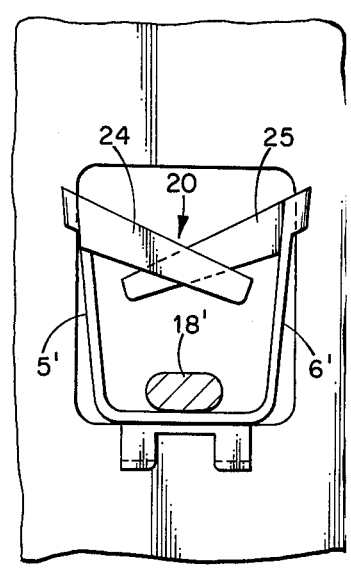

FIG. 5 illustrates the manner in which the cable protector 1 is employed within an opening, specifically, a circular opening, in a construction member such as a thin-gauge metal stud. As shown in FIG. 5, the pairs of gripping members 9 and 10 are made to grip the thin material of the portion of the stud at the periphery of the opening adjacent to the flat base portion of the V-shaped member 3, and the flat side portions 5 and 6 of the V-shaped member 3 are flexed toward each other until the pairs of confinement members 14 and 15 are able to physically engage the material of other portions of the stud at the periphery of the opening adjacent to the free extremities of the side portions 5 and 6, these portions of the stud being centered in the spaces between the individual members of the pairs of confinement members 14 and 15. The outward biasing of the side portions 5 and 6 following the flexing of the side portions 5 and 6 insures a tight fit for the cable protector 1 within the opening in the stud. The aforementioned difference in heights between the front and rear members of the pairs of gripping members 9 and 10 facilitates the entry of the cable protector 1 in the opening in the stud. Once the cable protector 1 has been positioned within the opening in the stud and secured to the stud as shown in FIG. 5, a cable 18, shown in cross section in FIG. 5, may then be made to pass through the V-shaped member 3 of the cable protector 1 and the associated opening in the stud. (Alternatively, but less desirably, the cable 18 may be first made to pass through the opening in the stud and the cable protector then made to fit around the cable 18 and to be affixed to the stud.)

Figure 9:
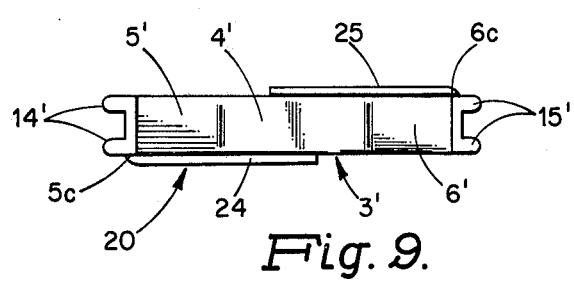

Referring now to FIGS. 6–9, there is shown in perspective, front, side and top views, respectively, an improved cable protector 20 in accordance with the present invention. The improved cable protector 20 is similar to the aforedescribed cable protector 1 but eliminates the possibility of a cable protected thereby from making physical contact with any exposed edge surfaces of the material of the stud adjacent to the opening in the stud, a possibility that is present when the aforedescribed prior art cable protector 1 is used, as previously described in the section entitled "Background of the Invention." The cable protector 20 as shown in FIGS. 6–9 has many of the same elements as the cable protector 1, the elements of the cable protector 20 also common to the cable protector 1 being designated in FIGS. 6–9 by primed reference numerals. The cable protector 20 differs from the prior art cable protector 1 in that it employs a pair of flat horizontal arm members 24 and 25. These horizontal arm members 24 and 25 are integral with the side portions 5' and 6' of the V-shaped member 3' and close off, or bridge, the open side of the V-shaped member 3'. As shown in FIGS. 6–9 and particularly FIG. 9, the horizontal arm member 24 extends from a front edge surface 5c of the side portion 5' of the V-shaped member 3'0 to a point past the center of a line between the extremities of the side portions 5' and 6' of the V-shaped member 3' and, similarly, the other horizontal arm member 25 extends from a rear edge surface 6c of the side portion 6' of the V-shaped member 3' to a point past the center of a line between the extremities of the side portions 5' and 6'. In addition, the arm members 24 and 25 slope downwardly a slight amount, as shown most clearly in FIG. 7, for reasons to be explained hereinafter. With the arm members 24 and 25 arranged as shown in FIGS. 6–9, an open space is established between the inner surfaces of the arm members 24 and 25, as best shown in FIG. 9, the purpose of this space also to be described in detail hereinafter.

FIGS. 10—13 illustrate the manner in which the improved cable protector 20 of the invention may be inserted and positioned within an opening having one of several possible physical configurations. It will be noted from each of FIGS. 10–13 that as the side portions 5' and 6' of the cable protector 20 are flexed toward each other in the process of inserting and positioning the cable protector 20 within its associated opening, the downwardly sloping horizontal arm members 24 and 25 move in opposite directions past each other and, in effect, form a crossed, or X, configuration. The crossing of the horizontal arm members 24 and 25 to form the X configuration reduces the effective volume initially enclosed by the V-shaped member 3' and the horizontal arm members 24 and 25 and insures that a cable 18' made to pass through the cable protector 20 cannot move upwardly around and past the crossed horizontal arm members 24 and 25 to make physical contact with the material of the portion of the stud above or to the sides of the horizontal arm members 24 and 25. In addition, the crossing of the arm members 24 and 25, together with the flexibility of the side portions 5' and 6', renders the cable protector 20 very versatile and makes it possible for the cable protector 20 to be used with openings of different sizes and configurations. Further, the fact that the horizontal arm members 24 and 25 each have a length less than the total distance between the extremities of the side portions 5' and 6' insures that the horizontal arm members 24 and 25 will not interfere with either the side portions 5' and 6' or the stud itself at such time as the side portions 5' and 6' are flexed toward each other during an insertion operation. The spacing between the horizontal arm members 24 and 25 further allows the cable protector 20 to be manipulated at an opening in the stud to fit around an existing cable made to pass through the opening. This latter operation would not be possible if the side portions 5' and 6' were completely bridged together, as by a single horizontal arm, to form a completely enclosed cable protector.

While there has been described what is considered a preferred embodiment of the invention, it will be obvious to those skilled in the art that various modifications and changes may be made therein without departing from the invention as called for in the appended claims.

What is claimed is:

1. A protector device for providing 360° protection for an elongated member arranged to pass through the protector device and through an opening in a construction member in which the protector device is adapted to be inserted, said protector device comprising:
   a main body member including:
   a. a base portion having first and second end regions;
   b. a first flexible side portion extending upwardly from and forming an angle with the first end region of the base portion; and
   c. a second flexible side portion extending upwardly from and forming an angle with the second end region of the base portion;
   gripping means associated with the base portion of the main body member for gripping at least one portion of a construction member at the periphery of an opening in the construction member;
   confinement means associated with the first and second side portions of the main body member for engaging other portions of the construction member at the periphery of the opening in the construction member;
   a first arm member extending from the first side portion of the main body member in a direction toward the second side portion of he main body member, said first arm member being in a first plane;
   a second arm member extending from the second side portion of the main body member in a direction toward the first side portion of the main body member, said second arm member being in a second plane offset with respect to the first plane of the first arm member whereby an open space is established between the first and second arm members;
   each of the first and second arm members having a length whereby when the first and second flexible side portions of the main body member are flexed toward each other the first and second arm members move past each other in opposite directions.

2. A protector device in accordance with claim 1 wherein:
   the first side portion of the main body has a front surface;
   the second side portion of the main body member has a rear surface;
   the first arm member extends from the front surface of the first side portion in the direction toward the second side portion; and
   the second arm member extends from the rear surface of the second side portion in the direction toward the first side portion.

3. A protector device in accordance with claim 2 wherein:
   the first flexible side portion of the main body member has a first end fixed to the first end region of the base portion of the main body member and an opposite free end;
   the second flexible side portion of the main body member has a first end fixed to the second end region of the base portion of the main body member and an opposite free end; and
   each of the first and second arm members has a length greater than half but less than the full distance between the free ends of the first and second side portions of the main body member.

4. A protector device in accordance with claim 3 wherein:
   each of the first and second flexible side portions of the main body member forms an obtuse angle with its associated end region of the base portion of the main body member.

5. A protector device in accordance with claim 4 wherein:
   the base portion of the main body member has a bottom surface; and
   the gripping means includes a pair of gripping members extending from the bottom surface of the base portion of the main body member and spaced from each other by a distance at least equal to the thickness of the construction member at the periphery of the opening in the construction member in which the protector device is to be inserted.

6. A protector device in accordance with claim 5 wherein:
   one of the gripping members of the pair of gripping members is longer than the other gripping member.

7. A protector device in accordance with claim 6 wherein:
   each of the first and second flexible side portions of the main body member has an outer surface; and the confinement means includes first and second pairs of confinement members extending from the outer surfaces of the first and second side portions, respectively, of the main body member, the confinement members of each of the pairs of confinement members being spaced from each other by a distance greater than the thickness of the construction member at the periphery of the opening in the construction member in which the protector device is to be inserted.

8. A protector device in accordance with claim 7 wherein:
the base portion and the first and second flexible side portions of the main body member are flat; and
the first and second arm members are flat.

9. A protector device in accordance with claim 8 wherein:
the first arm member slopes downwardly along a line toward the second side portion of the main body member; and
the second arm member slopes downwardly along a line toward the first side portion of the main body member.

* * * * *